Feb. 27, 1951  R. E. KING  2,543,030
AUTOMATIC AMPLITUDE CONTROL FOR OSCILLATORS
Filed March 26, 1946

INVENTOR
RICHARD E. KING

BY *M. Hayes*

ATTORNEY

Patented Feb. 27, 1951

2,543,030

UNITED STATES PATENT OFFICE 2,543,030

AUTOMATIC AMPLITUDE CONTROL FOR OSCILLATORS

Richard E. King, York, Pa.

Application March 26, 1946, Serial No. 657,315

16 Claims. (Cl. 250—36)

(Granted under the act of March 3, 1883, as amended April 30, 1928; 370 O. G. 757)

This invention relates to electron tube oscillators and more specifically to an automatic amplitude control for electron tube oscillators.

For many applications of electron tube oscillators, particularly signal generators, it is desirable to maintain constant amplitude of oscillation. In conventional electron tube oscillator circuits the amplitude varies considerably as the oscillator is tuned over its frequency range. The amplitude at any one frequency may also vary due to heating of the circuit elements. The present control circuits, such as diode limiters, reduce this variation but have faults such as distortion of the waveforms and limited range of control.

The object of this invention is to provide an improved oscillator amplitude control circuit.

Another object is to provide an amplitude control circuit for an electron tube oscillator having a large range of control over a great range of frequencies.

These and other objects will be apparent from the following specifications when considered with the accompanying drawing in which.

Figure 1:
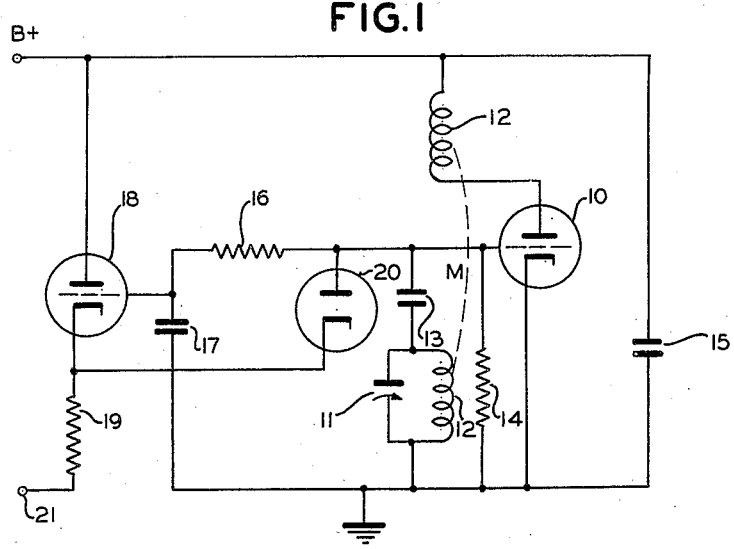
Fig. 1 is a schematic diagram of one embodiment of the invention.

Referring now to Fig. 1, electron tube 10, variable capacitor 11, inductor 12, capacitor 13, and resistor 14 form a conventional tuned grid oscillator circuit. The resonant circuit is formed by the parallel combination of variable capacitor 11 and one winding of inductor 12. The resonant circuit connects to ground and is coupled to the control grid of tube 10 through grid capacitor 13. The plate of tube 10 connects through a second winding of inductor 12 to a source of plate potential B+. The cathode of tube 10 is grounded. A resistor 14 connects from the grid of tube 10 to ground. A by-pass capacitor 15 connects from the plate potential B+ to ground. The control circuit is formed by electron tube 18, resistor 16, capacitor 17, resistor 19, and electron tube 20. Resistor 16 connects from the grid of tube 10 to the grid of tube 18. Capacitor 17 connects from the grid of tube 18 to ground. The plate of tube 20 is connected to the grid of tube 10. The cathodes of tubes 18 and 20 are connected together and to resistor 19. Resistor 19 connects in turn to a source of negative potential at terminal 21.

In operation of the circuit shown in Fig. 1, when plate potential B+ is applied oscillation will start in the oscillator circuit. The frequency of oscillation will depend largely upon the resonant circuit and may be varied by a change of variable capacitor 11. Feedback to maintain oscillation is obtained through the mutual inductance M between the two windings of inductor 12. Grid leak bias will be produced by the action of grid capacitor 13 and grid resistor 14. On the positive cycle of oscillation the grid of tube 10 will be driven positive and the grid will draw current. This current will place a charge on capacitor 13 making the average potential of the grid negative in respect to ground. The charge on capacitor 13 will increase until an equilibrium condition exists where the loss in charge due to current flow through resistor 14 equals the gain in charge due to grid current. Capacitor 15 by-passes the oscillation frequency voltages from the source of plate potential B+ to ground. Output may be obtained from the oscillator in any conventional manner.

Now consider the action of the control circuit. The voltage at the grid of tube 18 will be equal to the grid bias of the oscillator. The voltage at the grid of tube 10 is coupled to the grid of tube 18 by resistor 16 and the oscillation frequency voltage is by-passed to ground by capacitor 17. Tube 18 is connected as a cathode follower with cathode load resistor 19. As the cathode of tube 18 is connected through resistor 19 to a negative voltage, tube 18 will normally be conducting. With tube 18 conducting, the voltage at the cathode will be several volts more positive than the voltage at the grid, as determined by the characteristics of the tube 18. Tube 20, a diode, is connected to limit the maximum potential at the grid of oscillator tube 10 to the potential at the cathode of tube 18.

The amplitude of oscillation normally would be determined by the feedback ratio of inductor 12, the power delivered by the tube 10 to the resonant circuit, and the efficiency of the resonant circuit including any external loading. This latter term varies considerably as capacitor 11 is varied to change the oscillation frequency. The amplitude of oscillation in the oscillator circuit would normally be very large. However, the control circuit will limit the amplitude in the following manner. As the amplitude increases the grid bias of the oscillator becomes more negative. This increasing grid bias is coupled to the grid of tube 18, causing the cathode voltage of tube 18 to become more negative. When the potential at the cathode of tube 18 becomes negative in respect to ground, limiter tube 20 will become conducting on the positive cycles of oscillation. Thus, tube 20 will limit the maximum grid potential of the oscillator tube 10. As the grid of the oscillator tube 10 will not be driven as far positive as before, the operating characteristics of tube 10 will be changed. Tube 10 will deliver less power to the resonant circuit reducing the tendency for the amplitude of oscillation to increase. As an increase in amplitude increases the oscillator bias, which lowers the limiting potential, which, in turn, reduces the tendency for the amplitude to increase, an equilibrium condition will be reached at which no further increases in amplitude will occur.

The amplitude will be very constant over a wide range of oscillator tuning and loading, so long as the amplitude of oscillation is sufficient to cause the control circuit to operate. The values of resistor 16 and capacitor 17 should be such as to allow the control circuit to respond to rapid amplitude changes. This control circuit may be applied to other types of electron tube oscillators having grid leak bias, such as, tuned plate oscillators, Hartley oscillators, and Colpitt's oscillators.

Figure 2:
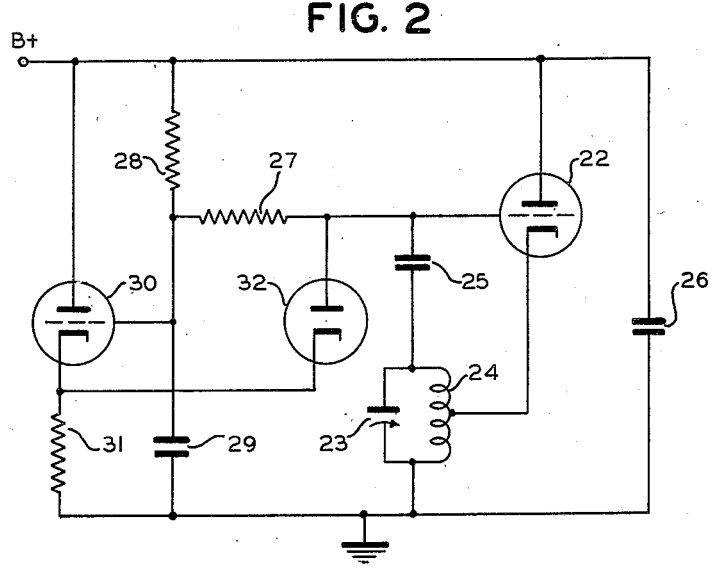
Fig. 2 shows a schematic diagram of another embodiment of the invention.

In Fig. 2, the control circuit is shown connected to control the amplitude of oscillation of a modified Hartley oscillator. As the cathode of the tube in this oscillator circuit is not grounded, some modifications of the control circuit are necessary. The oscillator circuit is formed by electron tube 22, variable capacitor 23, inductor 24, grid capacitor 25, resistors 27 and 28, and by-pass capacitor 26. The resonant circuit is formed by the parallel combination of capacitor 23 and inductor 24. The resonant circuit connects to ground and is coupled to the control grid of oscillator tube 22 through grid capacitor 25. The plate of tube 22 connects to a source of plate potential B+. Feedback is obtained by the cathode of tube 22 connecting to a tap on inductor 24. Resistors 27 and 28 connect in series from the grid of tube 22 to plate potential B+. By-pass capacitor 26 connects from plate potential B+ to ground. The control circuit is formed by electron tube 30, capacitor 29, resistor 31, and electron tube 32. The junction of resistors 27 and 28 connects to the grid of tube 30 and also through by-pass capacitor 29 to ground. The cathode of tube 30 connects through resistor 31 to ground. The plate of tube 32 connects to the grid of tube 22 and the cathode of tube 32 connects to the cathode of tube 30.

In operation of the circuit shown in Fig. 2, when plate potential B+ is applied oscillation will start in the oscillator circuit. The conditions of oscillation will be essentially the same as described for the oscillator in Fig. 1. As feedback to maintain oscillation is obtained through the cathode connection of tube 22 to a tap on inductor 24, the cathode of tube 22 will be driven positive on the positive cycle of oscillation. The grid of tube 22 will also be driven positive and grid leak bias will be developed across capacitor 25 and resistors 27 and 28. Capacitor 26 by-passes the oscillation frequency from the plate of tube 22 to ground. Output may be obtained from the oscillator in any conventional manner.

Considering the action of the control circuit, the voltage at the grid of tube 30 will be determined by the voltage divider formed by resistors 27 and 28. Resistor 27 in the voltage divider may be replaced by a constant voltage device, such as a voltage regulator tube. As resistor 27 connects to the grid of the oscillator tube 22 and resistor 28 connects to the plate potential B+, the voltage at the grid of tube 30 will be more positive than, but proportional to, the grid bias developed in the oscillator circuit. The values of resistors 27 and 28 are so selected that tube 30 is normally conducting. Capacitor 29 by-passes the voltages at the oscillation frequency to ground. As tube 30 is connected as a cathode follower, the voltage developed across resistor 31 will be several volts more positive than the grid voltage. Thus the voltage at the cathode of tube 32 will become less positive as the grid bias of the oscillator increases. Tube 32 is connected to limit the maximum grid voltage of tube 22 to the cathode voltage of tube 30. The amplitude control will operate as before; increasing amplitude of oscillation increases the oscillator grid bias, which lowers the cathode potential of tube 32, which, in turn, limits the maximum oscillator grid potential and reduces the tendency for the oscillator amplitude to increase. Thus, an equilibrium condition will be reached at which no further increase in amplitude will occur. The amplitude will be stabilized at this level, as any tendency for the amplitude to increase will be counteracted by a lowering of the limiting potential.

The invention may be applied to other types of electron tube oscillators having grid leak bias. It is only essential that the normal amplitude of oscillation in the oscillator be sufficiently large to allow the control circuit to operate. The oscillator may be coupled to a load in any conventional manner. While particular embodiments of this invention have been illustrated and described, it is to be understood that the invention is not to be limited thereby in its details of operation and construction, except as appears hereafter in the claims.

The invention described herein may be manufactured and used by or for the Government of the United States of America for governmental purposes without the payment of any royalties thereon or therefor.

What is claimed is:

1. In an electron tube oscillator, an automatic amplitude control circuit comprising, means for providing a limiting potential, an electron tube operative to limit the maximum amplitude of oscillation of said oscillator to said limiting potential, and automatic means for varying said limiting potential inversely as the amplitude of oscillation.

2. In an electron tube oscillator, said electron tube having a control grid and utilizing grid leak bias for said control grid thereof, an automatic amplitude control circuit comprising, an electron tube, means for providing a limiting potential, said electron tube being operative to limit the maximum potential at said control grid of said oscillator to said limiting potential, and automatic means for varying said limiting potential inversely as the amplitude of oscillation.

3. In an electron tube oscillator, said electron tube having a control grid and utilizing grid leak bias for said control grid thereof, an automatic amplitude control circuit comprising, means for providing a limiting potential, automatic means for varying said limiting potential directly as said grid leak bias of said oscillator, and an electron tube being operative to limit the maximum potential at said control grid of said oscillator to said limiting potential.

4. In an electron tube oscillator, said electron tube having a control grid and utilizing grid leak bias for said control grid thereof, an automatic amplitude control circuit comprising, a cathode follower circuit, means for controlling the output potential of said cathode follower circuit by said grid leak bias of said oscillator, and a means to limit the maximum potential at said control grid of said oscillator to said output potential of said cathode follower circuit.

5. In an electron tube oscillator, said electron tube having a control grid and utilizing grid leak bias for said control grid thereof, an automatic amplitude control circuit comprising, a cathode follower circuit, means for controlling the output potential of said cathode follower circuit by said grid leak bias of said oscillator, and an electron tube, said tube being operative to limit the maximum potential at said control grid of said oscillator to said output potential of said cathode follower circuit.

6. In an electron tube oscillator, said electron tube having a control grid and utilizing grid leak bias for said control grid thereof, an automatic amplitude control circuit comprising, an electron tube having a cathode, grid, and plate, a source of plate potential, said plate of said tube being connected to said source of plate potential, a source of negative potential, a resistor connected from said cathode of said tube to said source of negative potential, means for coupling said grid leak bias of said oscillator to said grid of said tube, and means for limiting the maximum potential at said control grid of said oscillator to the potential at said cathode of said tube.

7. An automatic amplitude control circuit for an electron tube oscillator, said electron tube having a control grid and utilizing grid leak bias for said control grid thereof, said control circuit comprising, a cathode follower circuit, means for controlling the output potential of said cathode follower circuit by said grid leak bias of said oscillator, and an electron tube having a cathode and plate, said plate of said tube being connected to said control grid of said oscillator, said cathode of said tube being connected to said output potential of said cathode follower circuit.

8. An automatic control circuit for an electron tube oscillator, said electron tube having a control grid and utilizing grid leak bias for said control grid thereof, said control circuit comprising, a first electron tube having a cathode, grid, and plate, a source of plate potential connected to said plate of said first tube, a source of negative potential, a resistor connected from said cathode of said first tube to said source of negative potential, means for coupling said grid leak bias of said oscillator to said grid of said first tube, and a second electron tube having a cathode and plate, said plate of said second tube being connected to said control grid of said oscillator, said cathode of said second tube being connected to said cathode of said first tube.

9. In an electron tube oscillator having grid leak bias for the control grid thereof, an automatic amplitude control circuit comprising, a first electron tube having a cathode, grid, and plate, a source of plate potential connected to said plate of said first tube, a cathode load resistor in the cathode circuit of said first tube, a second resistor connected from said control grid of said oscillator to said grid of said first tube, a by-pass capacitor connected to said grid of said first tube and in circuit with said cathode of said first tube, and a second electron tube connected to limit the maximum potential at said control grid of said oscillator to the potential at said cathode of said first tube.

10. An automatic amplitude control circuit for an oscillator, said oscillator comprising, a first electron tube having a control grid, plate and cathode, means connected to said control grid, plate and cathode of said first tube to form therewith an electron tube oscillator having grid leak bias on said control grid, said control circuit comprising, a second electron tube having a cathode, grid, and plate, a source of plate potential connected to said plate of said second tube, a cathode load resistor connected to said cathode of said second tube, a second resistor connected from said control grid of said first tube to said grid of said second tube, a by-pass capacitor connected to said grid of said second tube, a third electron tube having a cathode and plate, said cathode of said third tube and said cathode of said second tube connected together, said plate of said third tube connected to said control grid of said first tube.

11. An automatic amplitude control circuit for an oscillator, said oscillator comprising, a first electron tube having a plate, cathode and a control grid, means connected to said plate, cathode and control grid of said first tube to form therewith an electron tube oscillator wherein the feedback is obtained through the cathode circuit of said first tube, said oscillator having grid leak bias on said control grid, said control circuit comprising, a second electron tube having a cathode, grid, and plate, a source of plate potential connected to said plate of said second tube, a cathode load resistor connected to said cathode of said second tube, a voltage divider connected to said control grid of said first tube to said grid of said second tube and to said source of plate potential, a by-pass capacitor connected to said grid of said second tube, and a third electron tube having a cathode and plate, said cathode of said second tube, and said cathode of said third tube connected together, said plate of said third tube connected to said control grid of said first tube.

12. In an oscillator, an amplitude control circuit comprising, means for establishing a limiting potential, diode clamping means operative to limit the maximum amplitude of oscillation of said oscillator to said limiting potential, and means for varying said limiting potential in a predetermined relation to the amplitude of oscillation.

13. In an electron tube oscillator, an automatic amplitude control circuit comprising, means for establishing a limiting potential, rectifier coupling means operative to limit the maximum amplitude of oscillation of said oscillator to said limiting potential, and means for varying said limiting potential inversely as the amplitude of oscillation.

14. In an oscillator, an amplitude control circuit comprising, means for establishing a limiting potential, clamping means operative to limit the maximum amplitude of oscillation of said oscillator to a value bearing a predetermined relationship to said limiting potential, and means for varying said potential in a predetermined relation to the amplitude of oscillation.

15. In an oscillator, an amplitude control circuit comprising, means for establishing a limiting potential, a rectifier coupled to said limiting potential establishing means for limiting the maximum amplitude of oscillation of said oscillator to a value bearing a predetermined relationship to said limiting potential, and means for varying said potential in a predetermined relation to the amplitude of oscillation.

16. In combination with an electron tube oscillator, automatic amplitude control means comprising, a cathode follower circuit, means coupling said cathode follower to said oscillator for controlling the output potential of said cathode follower, and means for maintaining a potential applied to said oscillator at a value no greater than the output potential of said cathode follower.

RICHARD E. KING.

REFERENCES CITED

The following references are of record in the file of this patent:

UNITED STATES PATENTS

| Number | Name | Date |
|---|---|---|
| 2,320,876 | Marby | June 1, 1943 |
| 2,373,437 | Vanderlyn et al. | Apr. 10, 1945 |
| 2,424,905 | Scheldorf | July 29, 1947 |